United States Patent
Williams et al.

(10) Patent No.: US 8,793,342 B2
(45) Date of Patent: Jul. 29, 2014

(54) INTERPRETING WEB APPLICATION CONTENT

(75) Inventors: Bruce Williams, San Diego, CA (US); David M. Hall, Brush Prairie, WA (US); Jonathan Newman, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 12/869,175

(22) Filed: Aug. 26, 2010

(65) Prior Publication Data
US 2012/0054313 A1    Mar. 1, 2012

(51) Int. Cl.
  *G06F 15/173* (2006.01)
(52) U.S. Cl.
  USPC .......................................... 709/219; 709/226
(58) Field of Classification Search
  CPC ..... H04L 67/02; H04L 67/327; H04L 69/329; H04L 63/126; H04L 67/18; H04L 67/34; H04L 9/3239; H04L 9/3247
  USPC .......................................... 709/219, 226, 238
  See application file for complete search history.

(56) References Cited

U.S. PATENT DOCUMENTS

| | | | | |
|---|---|---|---|---|
| 6,029,180 | A * | 2/2000 | Murata et al. | 715/251 |
| 7,107,517 | B1 * | 9/2006 | Suzuki et al. | 715/207 |
| 7,181,683 | B2 * | 2/2007 | Chang | 715/231 |
| 7,529,795 | B2 * | 5/2009 | Arav | 709/204 |
| 7,594,003 | B2 | 9/2009 | Davidson et al. | |
| 7,680,810 | B2 * | 3/2010 | Marcjan et al. | 707/722 |
| 7,949,781 | B1 * | 5/2011 | Levitan | 709/235 |
| 8,099,463 | B2 * | 1/2012 | Horowitz et al. | 709/204 |
| 2003/0080995 | A1 | 5/2003 | Tenenbaum et al. | |
| 2006/0041834 | A1 * | 2/2006 | Chen et al. | 715/509 |
| 2006/0069618 | A1 | 3/2006 | Milener et al. | |
| 2007/0288563 | A1 * | 12/2007 | Karkanias | 709/204 |
| 2008/0201332 | A1 | 8/2008 | Souders et al. | |
| 2008/0209493 | A1 | 8/2008 | Choi et al. | |
| 2009/0292791 | A1 | 11/2009 | Livshits et al. | |
| 2009/0320119 | A1 * | 12/2009 | Hicks et al. | 726/9 |

FOREIGN PATENT DOCUMENTS

CN    101325602 A    12/2008

OTHER PUBLICATIONS

Carl; "Nextstop for the iPhone"; http://blog.nextstop.com/2009/12/nextstop-for-iphone.html; Dec. 15, 2009.
"Web Content Preloader" http://www.getsnappy.com/web-optimization/http-https-page-prefetching.html.

* cited by examiner

Primary Examiner — Phuoc Nguyen
(74) Attorney, Agent, or Firm — Garry Perry

(57) ABSTRACT

In one embodiment, first content that is common to, or included within, each of a plurality of web applications is identified. The first content is interpreted, without presenting the interpreted first content until after receipt of an instruction to present one of the web applications. An instruction to present a selected one of the web applications is received. Second content of the selected web application is interpreted, the second content comprising content of the selected web application other than the first content. The interpreted first and second content are presented via a presentation device.

20 Claims, 6 Drawing Sheets

INTERPRETING WEB APPLICATION CONTENT

BACKGROUND

A general-purpose computing device, such as a personal computer (PC), is designed to meet a wide range of end-user needs. Other computing devices are dedicated to specific tasks and do not require all of the functionality of a general-purpose computing device. Examples of such specialized computing devices are those embedded in printers and certain portable electronic devices such as smart phones, video game consoles, and MP3 players.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Specialized computing devices can be designed in a manner that optimizes certain components and minimizes other components to reduce product size, reduce product cost and/or increase performance. For example, a controller that is embedded in a printer or a portable electronic device may include a processor that operates at a lower speed than does a processor typically found in a PC. In some environments, a specialized computing device utilizing a low speed processor runs a web browser application, and a user may experience long waiting times as web application content is interpreted and the results presented. Such waiting times can be a significant detractor from a user experience. Various embodiments of the present disclosure were developed in an effort to provide a method and a system to interpret web application content in manner that shortens visible interpretation time, and thereby increases user satisfaction.

The following description is broken into sections. The first, labeled "Environment", describes an example environment in which embodiments may be implemented. The second section, labeled "Components", describes various physical and logical components utilized to implement various embodiments. The third section, labeled as "Operation", describes steps taken to implement various embodiments. The fourth section, labeled "Example", describes a method and system of interpreting web application content in accordance with an embodiment.

Figure 1:
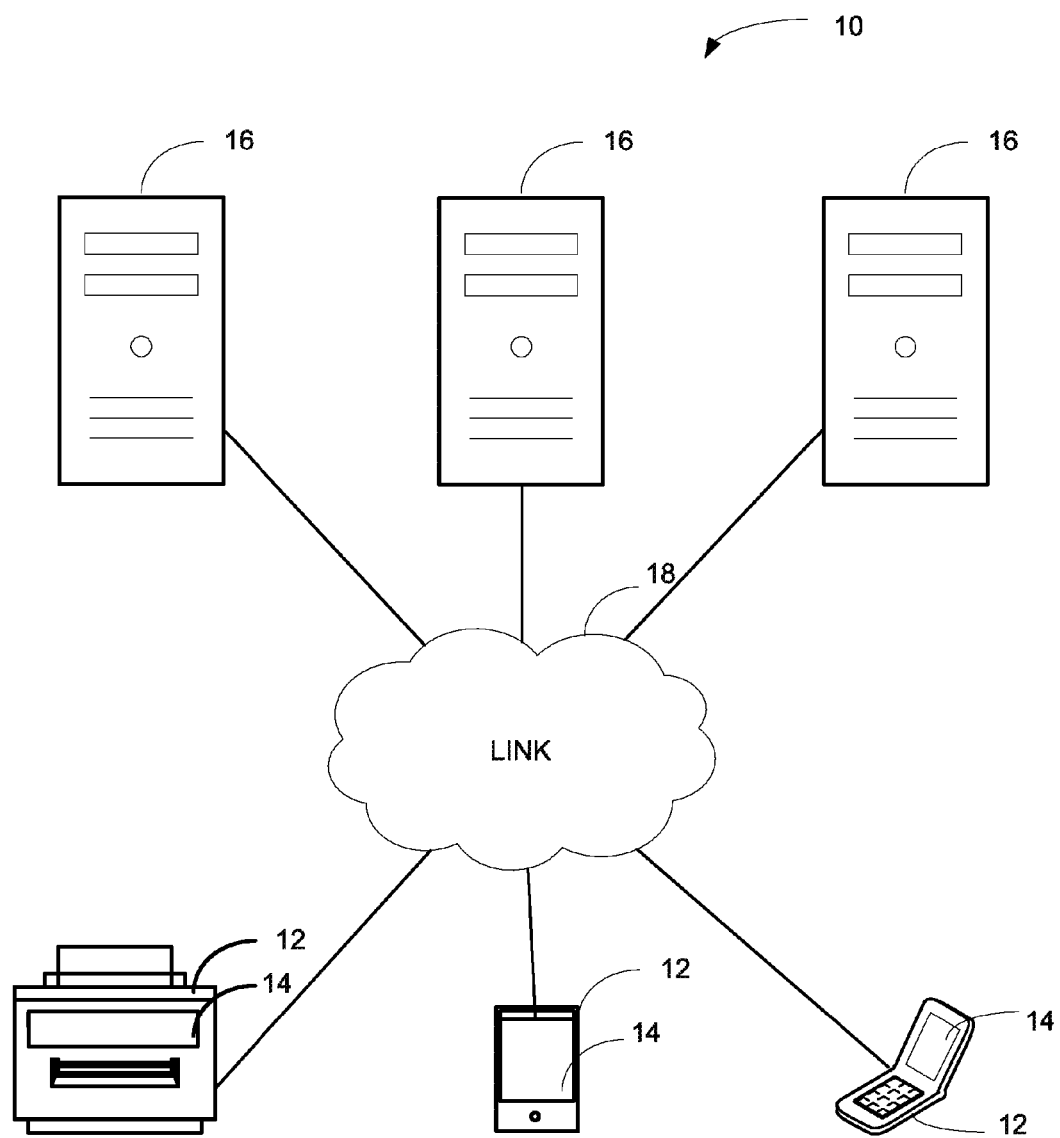
FIG. 1 depicts an example environment in which various embodiments may be implemented.

ENVIRONMENT: FIG. 1 depicts an example environment 10 in which various embodiments may be implemented. Environment 10 is shown to include client devices 12 and servers 16 interconnected via link 18. Client devices 12 represent generally any computing devices capable of communicating via a link 18 to obtain and interpret web application content, and then present a display, a view, an audible rendering, and/or other presentation of that content to a user. Example client devices 12 include web-connectable printers, smart phones, personal digital assistants, net-books, digital media players, video game consoles and the like that have an embedded processor and memory. Client devices 12 may be configured to interpret web content and present web content via a presentation device 14.

Interpreting of web content by a client device 12 may include interpreting instruction content that directs how subject matter content is presented. Instruction content may be written in a programming language such as HTML, or a combination of HTML and JavaScript. As used in this specification and the appended claims, "presenting content" and "presentation of content" means displaying, showing, rendering or otherwise making content available for visual, auditive, tactile or other reception by a user. Presenting content may include presenting visual subject matter content such as text, graphics, images, and motion video on a presentation device 14 that is a component of the client device 12. Presenting content may also include broadcasting audio subject matter content via one or more speakers. In embodiments, presentation device 14 may be a monitor, a LCD screen, one or more speakers, or any other form of output device for presentation of information for visual, tactile or auditive reception. In embodiments presentation device 14 may comprise, or be comprised within, a user interface. For example, presentation device 14 may be a touchscreen that displays web content and other information, and also receives user input by detecting the presence and location of a touch within portions, or all, of the touchscreen. The touchscreen may operate to accept input by detecting the touching of the display of the device with a finger or hand, and/or by sensing a passive object such as a stylus.

Each of the servers 16 represents generally any computing device capable of receiving and responding to network requests from a client computing device 12 via link 18. As discussed with reference to FIGS. 2-3 below, each of the servers 16 may be a web site designed to serve requested web application content to a client device 12.

Link 18 represents generally one or more of a cable, wireless, fiber optic, or remote connection via a telecommunication link, an infrared link, a radio frequency link, or any other connectors or systems that provides electronic communication. Link 18 may include, at least in part, an intranet, the internet, or a combination of both. Link 18 may also include intermediate proxies, routers, switches, load balancers, and the like. The paths followed by link 18 between client devices 12 and servers 16 as depicted in FIG. 1 represent the logical communication paths between these devices, not necessarily the physical paths between the devices.

Figure 2:
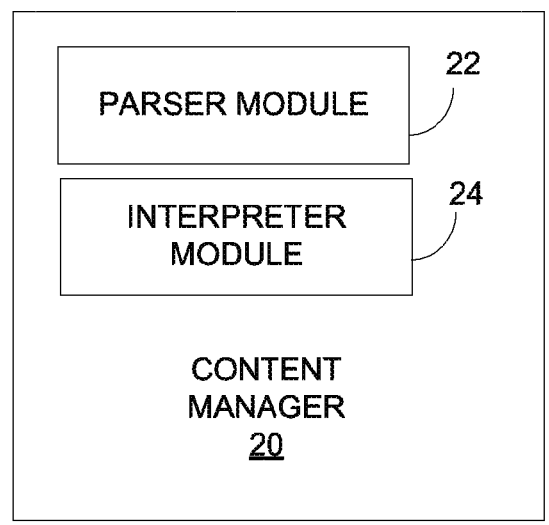
FIG. 2 depicts an example content manager according to an embodiment.

COMPONENTS: FIG. 2 depicts an example of a content manager 20. Content manager 20 represents generally any combination of hardware and programming configured for use to interpret content in a manner that shortens visible web-application launch time. In the example of FIG. 2, content manager 20 is shown to include a parser module 22 and an interpreter module 24.

Parser module 22 represents generally any combination of hardware and programming configured to identify first content that is content common to each of a plurality of web applications. Identifying first content may include specifically the content of the plurality of web applications, including reading program code. As used in this specification and the appended claims, a "web application" is a computer software application or web page that is coded in a browser-supported language (such as HTML, or HTML with JavaScript) and is reliant on a web browser application to render the application executable (or in the case of a web page, presentable). Examples of web applications are web pages, webmail, online search engines, online sale and auction sites, and wikis. As used in this specification and the appended claims, "content" means the text, images, sounds, videos, animations, data, applications and/or other subject matter that may be part of a user experience on a website (sometimes referred to herein as "subject matter content"), along with instructions as to formatting and presentation of the subject matter content (sometimes referred to herein as "instruction content").

In an embodiment, the parser module 22 is comprised within a client device 12 that is configured to display or otherwise present a specific set of web applications, and the plurality of web applications from which the first content is identified are all members of that specific set of authorized applications. For example, the parser module 22 may be comprised within a printer that is connected or connectable to the internet and/or a private network and that includes a web browser and a presentation device 14. The example printer may be configured to access Internet and display web pages and other web content from a specific set of web applications or specific set of web sites available on a private network, intranet or internet. The specific set of authorized web applications may be chosen for a variety of reasons, including the nature of the subject matter content, technical reasons (e.g. supported features or the size of the content to be downloaded and interpreted), or legal reasons (e.g. licensing arrangements). In many environments, the restricting of the client device 12 to a specific set of authorized web applications allows the parser module to efficiently identify common content.

Interpreter module 24 represents generally any combination of hardware and programming configured to interpret the first content that was identified. In embodiments, interpreting may include executing instructions in memory to perform some transformation and/or computation on data in a computing device memory. The interpreted first content is not presented until after receipt of an instruction to present one of the web applications. The interpreted first content may be held in memory. The interpreter module 24 is additionally configured to receive an instruction to present a selected one of the web applications. In an example, an instruction to present a selected one of the web applications may be received from a user via a user interface as the result of a user typing a universal resource locator (URL) into the address space of a web browser GUI. In another example, an instruction to present a selected one of the web applications may be received by virtue of a user mouse-clicking or otherwise executing a "hyperlink" contained in a web application or another document or application, e.g. an embedded hyperlink within a Microsoft Word® document. In another example, an instruction to present a selected one of the web applications may be received from an application running on the client computing device 12 or a server external to the client computing device 12. For example, a software application that runs on a web-connectable printer may be configured to send a message to a web browser running on the printer at 8:00 am each weekday morning, the message instructing the web browser to run and display a selected one of the web applications (e.g. the home page of a news site) via the presentation device 34. In another example, a web-connectable printer may be configured to receive an instruction to display a selected one of the web applications from a server external to the client 12, e.g. a server that a user has authorized to send web content loading instructions to the printer. In another embodiment, an instruction to present a selected one of the web applications may be received via an email message sent by a user, or received via an email message sent by another computing device.

The interpreter module 24 is additionally configured to interpret second content of the selected web application, the second content comprising content of the selected web application other than the first content. In one embodiment, the second content includes all of the content of the selected web application other than the first content. In another embodiment, the second content includes less than all of the content of the selected web application. In embodiments the first content common to each of the plurality of web applications and the second content include both subject matter and instruction content. In embodiments both the first content and the second content include HTML and JavaScript content.

The interpreter module 24 is additionally configured to present the interpreted first and second content via a presentation device 14. In one embodiment, presentation of the interpreted first and second content occurs after the first and second content have been fully interpreted. In this embodiment, a user viewing a presentation device would not observe building of the page as content is successively interpreted. The user could view the displayed page after interpretation of the first and second content has been completed. In another embodiment, presentation of the interpreted first and second content may begin after the first content is fully interpreted and prior to completion of interpretation of the second content. In this embodiment, a user viewing a visual presentation device might observe the building of the page as the second content is interpreted. Presentation of the first content portion of the web application (that was previously interpreted) is delayed until receipt of an instruction to present a particular web application that is comprised within the plurality of authorized web applications.

Figure 3:
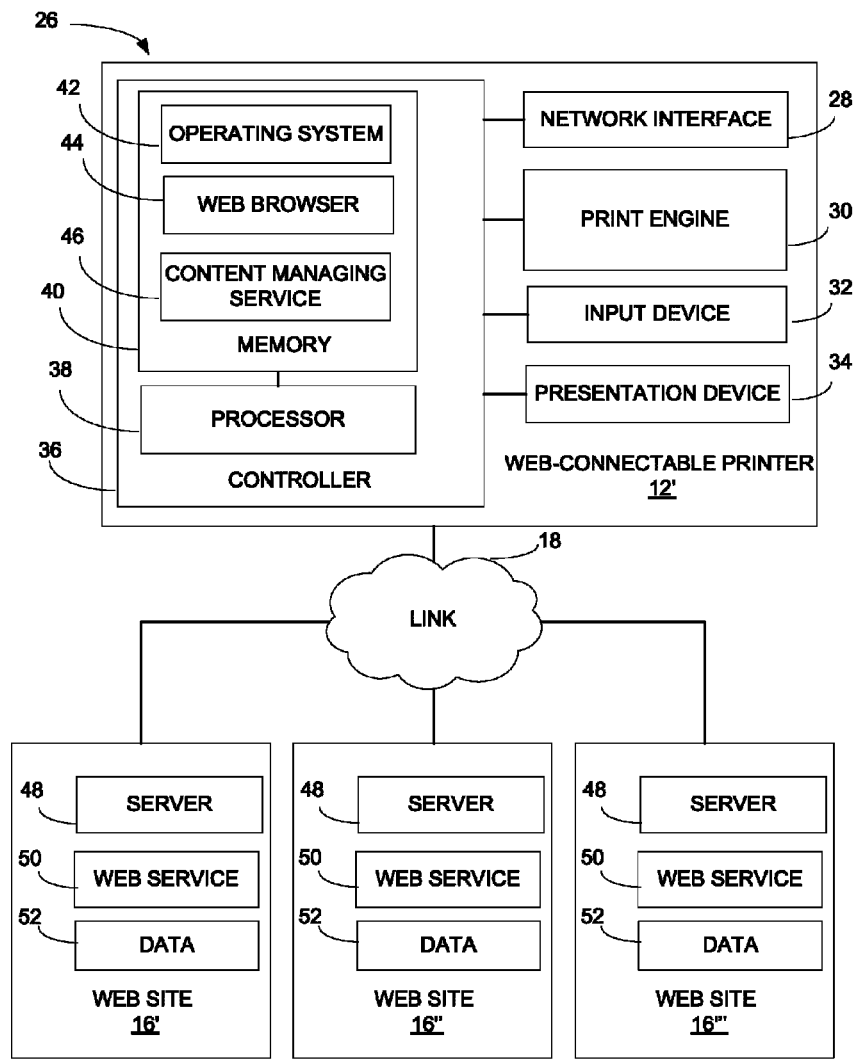
FIG. 3 depicts an implementation of the content manager of FIG. 2 according to an embodiment.

Content manager 20 may be implemented in a number of environments, such as environment 26 of FIG. 3. Environment 26 includes a client computing device that is web-connectable printer 12', server 16', server 16" and server 16''' interconnected via link 18.

Servers 16', 16" and 16''' are each shown as a web site including a web server 48, a web service 50, and data 52. Web server 48 represents generally any combination of hardware and programming capable of receiving and responding to requests originating from web-connectable printer 12'. Web service 50 represents generally any combination of hardware and programming capable of providing content for web server 48 to return to web-connectable printer 12' in response to a request. Data 52 represents a collection of content and data utilized by web service 30 to generate content. In embodiments the content includes subject matter content and instruction content. A request from web-connectable printer 12' may include a reference. Web server 48 passes that reference to web service 50. Web service 50 accesses content associated with the reference from data 52, passing that content back to web server 48. Web server 48 returns the content to web-connectable printer 12'.

Web-connectable printer 12' includes network interface 28, print engine 30, input device 32, presentation device 34 and controller 36. Network interface 28 represents generally any combination of hardware and programming capable of receiving print jobs from a host and communicating information related to the received print jobs back to the host. Print engine 30 represents generally any combination of hardware and programming capable of producing printed output from print jobs received from a host. In particular, print engine 30 utilizes imaging material such as ink or toner to form a desired image on a print medium. Input device 32 represents generally any combination of hardware and programming that enables a user to enter commands for the web-connectable printer 12'. Such an input device 32 may be implemented through one or more physical buttons or a touchscreen interface. In this example, presentation device 34 represents generally any combination of hardware and programming capable of presenting a visual display of content for viewing by a user. In an embodiment the input device 32 and the presentation device 34 may be incorporated within the same apparatus or component (for example a touchscreen interface). In another embodiment, the presentation device 34 may be additionally configured to present an audio or other non-visual display of content to a user.

As used in this example, controller 36 represents generally any combination of elements capable of acting as an embedded computing device to coordinate the operation of the network interface 28, the print engine 30, the input device 32 and the presentation device 34. In a given implementation, the controller 36 includes a processor 38 and a memory 40. The processor 38 may represent multiple processors, and the memory 40 may represent multiple memories. In an embodiment, the controller 36 may include a number of software components that are stored in a computing device-readable medium, such as memory 40, and are executable by processor 38. In this respect, the term "executable" includes a program file that is in a form that can be directly (e.g. machine code) or indirectly (e.g. source code that is to be compiled) performed by the processor 38. An executable program may be stored in any portion or component of memory 40.

Memory 40 is shown to include an operating system 42, a web browser 44 and a content managing service 46. Operating system 42 represents generally any software platform on top of which other programs or applications such as the web browser 44 and the content managing service 46 run. Examples include Linux® and Microsoft Windows®. Web browser 44 represents generally any combination of hardware and programming configured to send a request to web sites such as web sites 16', 16" and 16''', to receive content returned in response, and to format the content for display of a device view and/or other presentation of content by presentation device 34. In this example, a device view may be the graphical presentation of the content as configured to be viewed by a user of web-connectable printer 12'. A request may include user or device identifying data.

Content managing service 46 represents generally any programming, that, when executed, implements the functionality of the content manager of FIG. 2. In particular, content managing service 46, when executed by processor 38, is responsible for identifying first content that is content common to, or included within, each of the plurality of web applications. In an embodiment, content manager 46 is comprised within a client device that is configured to run and present a specific set of web applications, and the plurality of web applications are all members of that specific set of authorized applications. Content managing service 46 causes interpreting of the first content that was identified. Content managing service 46 causes the interpreted first content to not be presented until after receipt of an instruction to present one of the web applications. Content managing service 46 may cause the interpreted first content to be held in memory. Content managing service 46 receives an instruction to present a selected one of the web applications. Content managing service 46 causes second content of the selected web application to be interpreted, the second content comprising content of the selected web application other than the first content. In an embodiment, the second content includes all of the content of the selected web application other than the first content. In an embodiment, the second content includes less than all of the content of the selected web application. In an embodiment the first and second content include HTML and JavaScript content. Content managing service 46 causes the interpreted first and second content to be presented via a presentation device 14. In one embodiment, presentation of the interpreted first and second content occurs after interpretation of the first and second content has been completed. In an embodiment, presentation of the interpreted first and second content may begin after interpretation of the first content has been completed and prior to completion of interpretation of the second content.

Environment 26 is but one example of an implementation of content manager 20 (FIG. 2). Content manager 20 (FIG. 2) can be implemented in any computing device capable of communicating via a link 18 to obtain and interpret web application content, and presenting that web application content to a user. For example, the content manager 20 (FIG. 2) can be implemented in other client devices 12 (FIG. 1) such as smart phones, personal digital assistants, net-books, digital media players, and video game consoles.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 4:
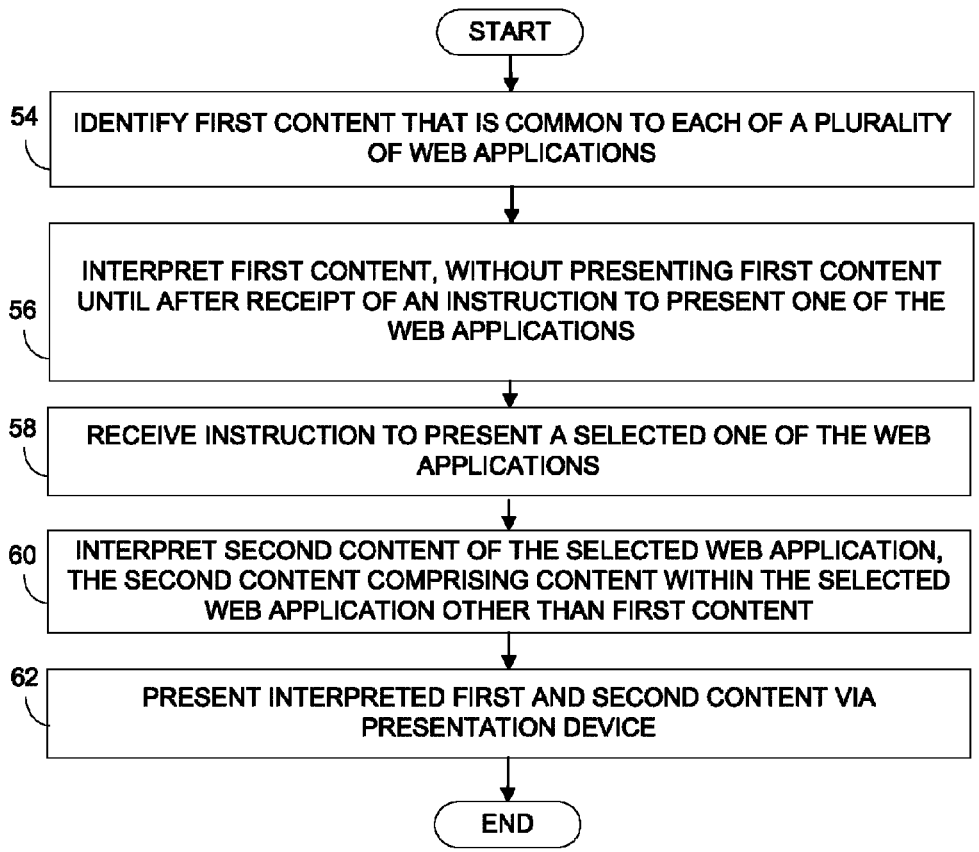
FIGS. 4-5 are flow diagrams depicting steps taken to implement various embodiments.
Figure 5:
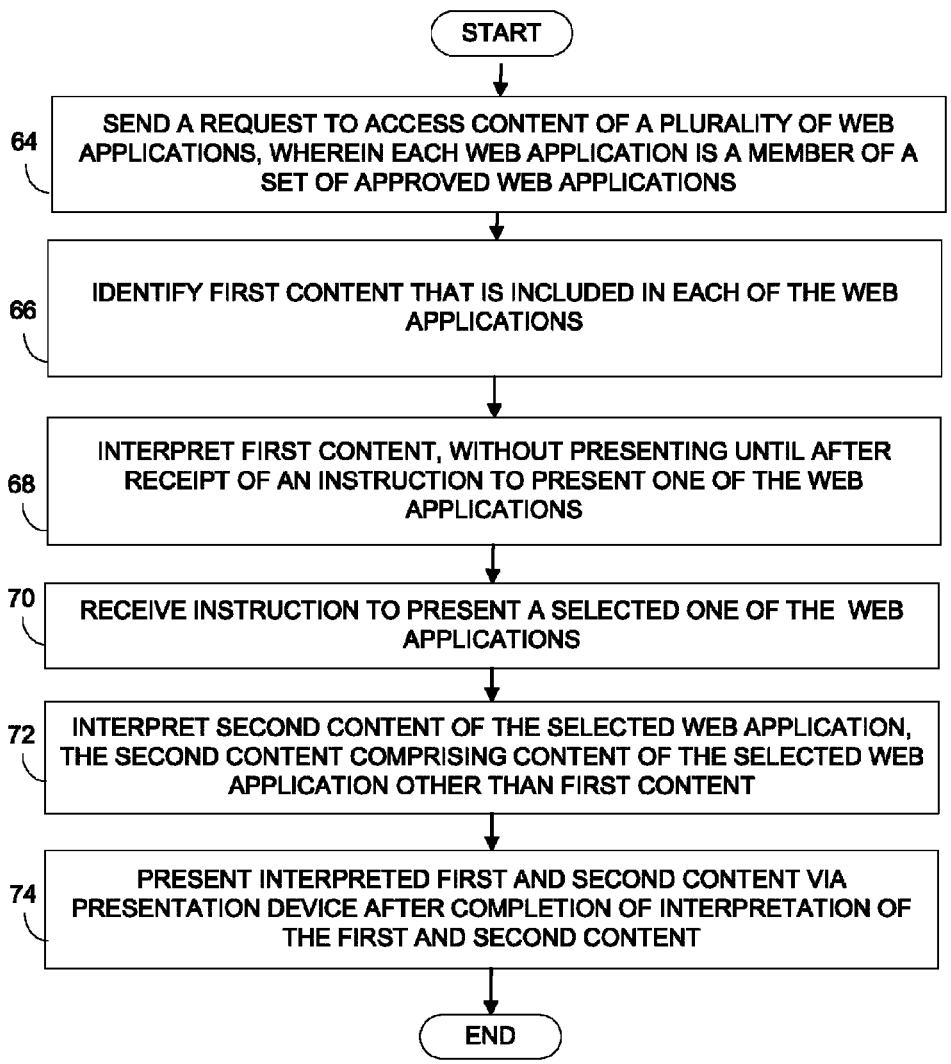

OPERATION: FIGS. 4 and 5 are example flow diagrams of steps taken to implement interpreting of web application content according to various embodiments. In discussing FIGS. 4 and 5, reference may be made to the diagrams of FIGS. 1-3 to provide contextual examples. Implementation, however, is not limited to those examples.

Starting with FIG. 4, first content that is common to each of a plurality of web applications is identified (block 54). Referring back to FIG. 2, the parser module 22 may be responsible for implementing block 54. In embodiments the first content may include subject matter content, such as text, photos or video. In embodiments the first content may also include instruction content, written in a programming language such as HTML or JavaScript, that directs how the subject matter content is formatted or presented.

Continuing with the flow diagram of FIG. 4, the first content is interpreted. The interpreted first content may be held in memory. The interpreted first content is not presented to a user until after receipt of an instruction to present one of the web applications comprised within the plurality of web applications (block 56). Referring back to FIG. 2, the interpreter module 24 may be responsible for implementing block 56.

Continuing with the flow diagram of FIG. 4, an instruction to present a selected one of the web applications is received (block 58). Referring back to FIG. 2, the interpreter module 24 may be responsible for implementing block 58. In an embodiment, an instruction may be received from a user, via a user interface, as a result of the user typing a URL into the address space of a web browser application GUI. In an embodiment, the instruction may be received from a user, via a user interface, as a result of the user activating a "hyperlink" contained within a web application, a document or another application.

Continuing with the flow diagram of FIG. 4, second content of the selected web application is interpreted, the second content comprising content of the selected web application other than the first content (block 60). Referring back to FIG. 2, the interpreter module 24 may be responsible for implementing block 60. In an embodiment the second content includes all of the content of the selected web application other than the first content.

Continuing with the flow diagram of FIG. 4, the interpreted first and second content is presented via a presentation device (block 62). Referring back to FIG. 2, the interpreter module 24 may be responsible for implementing block 62. In an embodiment, the presentation of the interpreted first and second content is a visual display to a user that occurs after the first and second content has been fully interpreted.

Moving on to FIG. 5, in a particular implementation, a request to access content of a plurality of web applications is sent to a web server or a plurality of web servers, wherein each web application is a member of a set of approved web applications (block 64). Referring back to FIG. 2, the parser module 22 may be responsible for implementing block 64. In an example, the request is sent via a browser application, and may comprise a plurality of URL requests for access to all content included within a set of web applications that was previously approved for access.

Continuing with the flow diagram of FIG. 5, first content that is included in each of the web applications is identified (block 66). Referring back to FIG. 2, the parser module 22 may be responsible for implementing block 66.

Continuing with the flow diagram of FIG. 5, the first content is interpreted, without presentation of the interpreted first content until after receipt of an instruction to present one of the web applications that is comprised within the plurality of web applications (block 68). Referring back to FIG. 2, the interpreter module 24 may be responsible for implementing block 68.

Continuing with the flow diagram of FIG. 5, an instruction to present a selected one of the web applications is received (block 70). Referring back to FIG. 2, the interpreter module 24 may be responsible for implementing block 70. In an example, an instruction to present a selected one of the web applications may be received from an application running on the client device that includes the parser and interpreting modules, or from another computing device. In an embodiment, an instruction to present a selected one of the web applications may be received via an email message sent by a user, or automatically sent by another computing device.

Continuing with the flow diagram of FIG. 5, second content of the selected web application is interpreted, the second content comprising content of the selected web application other than first content (block 72). Referring back to FIG. 2, the interpreter module 24 may be responsible for implementing block 72. In embodiments the first and second content include HTML content, and/or a combination of HTML and JavaScript content. In an example, the first content and/or the second content may include a library of JavaScript scripts that are common to a plurality of approved web applications.

Continuing with the flow diagram of FIG. 5, after completion of interpretation of the first and second content, the interpreted first and second content is presented via a presentation device (block 74). Referring back to FIG. 2, the interpreter module 24 may be responsible for implementing block 74. In an alternative embodiment, presentation of the interpreted first and second content begins after the first content is fully interpreted and prior to completion of interpretation of the second content. This alternative embodiment would allow a user to observe some of the building of the web application via the presentation device as second content is interpreted.

EXAMPLE

Figure 6:
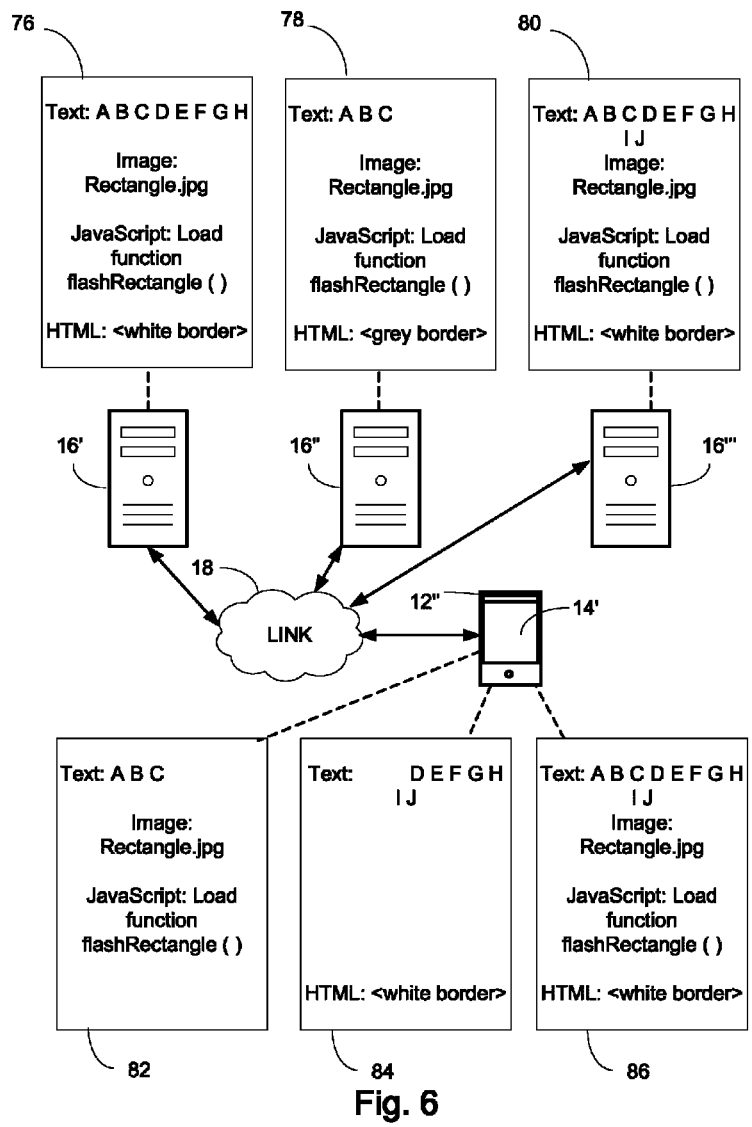
FIG. 6 depicts an example in which web application content is interpreted according to an embodiment.

The diagram of FIG. 6 provides an example implementation of interpreting web application content. Smart phone 12" is a computing device that connects to first server 16', second server 16" and third server 16'" via link 18. In other embodiments smart phone 12" could be any computing device capable of communicating via the link 18 to obtain and interpret web application content, and presenting a display, view or other presentation of interpreted content to a user. In this example smart phone 12" includes an embedded controller similar to the controller 36 depicted in FIG. 2, with a difference that the controller included in smart phone 12" controls a cell phone engine rather than a print engine 30 (FIG. 2). Smart phone 12" includes a presentation device in the form of a touchscreen 14' user interface. Smart phone 12" is be configured to interpret and present web content via the touchscreen 14'. The touchscreen 14' displays web content and other information, and also receives user input by detecting the presence and location of a touch within portions, or all, of the touchscreen. The touchscreen may operate to detect touch by a finger, hand, and/or a passive object such as a stylus.

Each of the servers 16', 16" and 16'" represents generally computing devices capable of receiving and responding to network requests from smart phone 12' via link 18. In this example, each of the servers 16', 16" and 16'" hosts a web site designed to serve requested web application content to clients such as smart phone 12" via link 18. In this example, link 18 represents a wireless telecommunication link. In other examples, link 18 may be any combination of connectors or systems that provides electronic communication. Link 18 may include, at least in part, an intranet, the Internet, or a combination of both.

Smart phone 12" sends a request to access web content to servers 16', 16" and 16'". In this example, the smart phone 12" is a client device configured to display a specific set of web applications, and the requests are requests to access all content of authorized web applications hosted on servers 16', 16" and 16'". First web application 76 hosted by server 16' includes subject matter content (text "A B C D E F G H" and image "Rectangle.jpg") and instruction content (a JavaScript instruction to load a flashRectangle function, and an HTML instruction to include a white border). Second web application 78 hosted by server 16" includes subject matter content (text "A B C" and "Rectangle.jpg") and instruction content (a JavaScript instruction to load the flashRectangle function, and an HTML instruction to include a grey border). Third web application 80 hosted by server 16'" includes subject matter content (text "A B C D E F G H I J" and "Rectangle.jpg") and instruction content (a JavaScript instruction to load the flashRectangle function, and an instruction to include a white border). Servers 16', 16" and 16'" could host a plurality of web pages, but for purposes of this example each of servers 16', 16" and 16'" is shown as hosting one web page.

Upon receipt of the requested content, incrementally or at once, a content managing service (similar to the content managing service 46 depicted in FIG. 3) that resides on the smart phone 12' identifies first content 82 that is included in each of the first 76, second 78, and third 80 web applications. In this example the first content 82 comprises text "A B C", the "Rectangle.jpg" image, and the JavaScript instruction to load the flashRectangle function that are common to each of the first 76, second 78 and third 80 web applications. The first content 82 is interpreted without presenting the interpreted first content until after the smart phone 12" receives an instruction to display one of the first 76, second 78 or third 80 web applications.

In this example, smart phone 12" receives an instruction from a user, communicated via touch pad 14', to display the third web application 80. The instruction may be received as the result of the user touching a "hyperlink" contained in a web application or another document or application that is displayed on the touchscreen 14'. At this point second content 84 of the third web application 80 is interpreted, the second content 84 comprising content of the third web application 80 other than the first content 82. In this example, the second content 82 includes all of the content of the third web application 80 other than the first content 82, comprising the text "D E F G H I J", and an HTML instruction to include a white border.

After completion of interpretation of the first and second content, the interpreted first and second content is presented as completed web application 86 via the touchscreen 14' presentation device. In an embodiment, presentation of the interpreted first and second content occurs after both the first content 82 and the second content 84 have been fully interpreted. In another embodiment, presentation of the interpreted first and second content begins after the first content 82 is fully interpreted and prior to completion of interpretation of the second content 84. The latter described embodiment may allow a user that views touchscreen 14' to observe the building of the web application content as the second content 84 is interpreted.

CONCLUSION: The diagram of FIG. 1 is used to depict an example environment in which various embodiments may be implemented. Implementation, however, is not so limited. FIGS. 2-3 show the architecture, functionality, and operation of various embodiments. Various components illustrated in FIGS. 2-3 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computing device-readable media for use by or in connection with an instruction execution system such as a computing device/processor based system or an ASIC (Application Specific Integrated Circuit) or other system that can fetch or obtain the logic from computing device-readable media and execute the instructions contained therein. "Computing device-readable media" can be any media that can contain, store, or maintain programs and data for use by or in connection with the instruction execution system. Computing device readable media can comprise any one of many physical media such as, for example, electronic, magnetic, optical, electromagnetic, or semiconductor media. More specific examples of suitable computing device-readable media include, but are not limited to, a portable magnetic computing device diskette such as floppy diskettes or hard drives, a random access memory (RAM), a read-only memory (ROM), an erasable programmable read-only memory, or a portable compact disc.

Although the flow diagrams of FIGS. 4-5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method to interpret web application content, the method comprising:
   identifying first content that is common to each of a plurality of different web applications;
   interpreting the first content, without presenting the interpreted first content until after receipt of an instruction to present one of the different web applications;
   receiving, after interpretation of the first content, an instruction to present a selected one of the different web applications;
   interpreting, after receipt of the instruction to present the selected web application, second content of the selected web application, the second content comprising content of the selected web application other than the first content; and
   presenting the interpreted first and second content via a presentation device.

2. The method of claim 1, further comprising sending a request to a server to access some or all of the content.

3. The method of claim 1, wherein each of the plurality of different web applications is a member of a set of approved web applications.

4. The method of claim 1, wherein the second content comprises all content of the selected web application other than the first content.

5. The method of claim 1, wherein the first and second content comprise HTML and JavaScript content.

6. The method of claim 1, wherein presenting the interpreted first and second content occurs after the first and second content have been fully interpreted.

7. The method of claim 1, wherein presenting the interpreted first and second content begins after the first content is fully interpreted and prior to completion of interpretation of the second content.

8. A system comprising a processor and a memory, the processor being configured to execute instructions stored in the memory, wherein the memory stores instructions in the form of a parser module and an interpreter module:
   the parser module when executed being configured to identify first content common to each of a plurality of different web applications; and
   the interpreter module when executed being configured to:
      interpret the first content without presenting the interpreted first content until after receipt of an instruction to present one of the different web applications;
      receive, after interpretation of the first content, an instruction to present a selected one of the different web applications;
      interpret, after receipt of the instruction to present the selected web application, second content of the selected web application, the second content comprising content of the selected web application other than the first content; and
      cause a presentation of the interpreted first and second content via a presentation device.

9. The system of claim 8,
   further comprising a web browser configured to send to a server a request to access content of at least one of the plurality of different web applications hosted on the server, and
   wherein the memory is further configured to store processor-executable instructions for the web browser, and
   wherein the processor further configured to execute the instructions.

10. The system of claim 8, further comprising the presentation device.

11. The system of claim 8, wherein the second content comprises all content of the selected web application other than the first content.

12. The system of claim 8, wherein the parser module, the interpreter module, the memory and the processor are comprised within a computing device that is configured to present a specific set of different web applications, and wherein each of the plurality of different web applications is a member of the set.

13. The system of claim 12, wherein the computing device comprises a printing device that is connectable to the internet and that includes a web browser and a presentation device.

14. The system of claim 8, wherein presenting the first and second content occurs after interpretation of the first and second content has been completed.

15. The system of claim 8, wherein presenting the interpreted first and second content begins after interpretation of the first content has been completed and prior to completion of interpretation of the second content.

16. A non-transitory computing device readable medium storing computing device executable instructions that when executed implement a method comprising:

identifying first content that is included within each of a plurality of different web applications;

interpreting the first content without presenting the interpreted first content until after receipt of an instruction to present one of the different web applications;

receiving, after interpretation of the first content, an instruction to present a selected one of the different web applications;

interpreting, after receipt of the instruction to present the selected web application, second content of the selected web application, the second content comprising content of the selected web application other than the first content; and presenting the interpreted first and second content via a presentation device.

17. The medium of claim 16, wherein each of the plurality of different web applications is a member of a set of previously approved web applications.

18. The medium of claim 16, wherein the second content comprises all content of the selected web application other than the first content.

19. The medium of claim 16, wherein presenting the interpreted first and second content occurs after the first and second content have been interpreted.

20. The medium of claim 16, wherein presenting the interpreted first and second content begins after the first content is interpreted and prior to completion of interpretation of the second content.

\* \* \* \* \*